(12) United States Patent
Tu et al.

(10) Patent No.: US 11,209,653 B2
(45) Date of Patent: Dec. 28, 2021

(54) NEAR-EYE DISPLAY APPARATUS

(71) Applicant: Acer Incorporated, New Taipei (TW)

(72) Inventors: Tsung-Wei Tu, New Taipei (TW);
Yi-Jung Chiu, New Taipei (TW);
Shih-Ting Huang, New Taipei (TW);
Yen-Hsien Li, New Taipei (TW)

(73) Assignee: Acer Incorporated, New Taipei (TW)

( * ) Notice: Subject to any disclaimer, the term of this patent is extended or adjusted under 35 U.S.C. 154(b) by 127 days.

(21) Appl. No.: 16/819,172

(22) Filed: Mar. 16, 2020

(65) Prior Publication Data
US 2021/0181508 A1    Jun. 17, 2021

(30) Foreign Application Priority Data

Dec. 16, 2019   (TW) .................................. 108145970

(51) Int. Cl.
*G02B 27/01*          (2006.01)
*G02B 27/28*          (2006.01)

(52) U.S. Cl.
CPC ....... *G02B 27/0172* (2013.01); *G02B 27/283* (2013.01); *G02B 27/286* (2013.01)

(58) Field of Classification Search
CPC ........ G02B 1/04; G02B 5/3033; G02B 1/105; G02B 1/14; G02B 5/3083; G02B 5/30; G02B 5/3025; G02B 1/111; G02B 5/3041; G02B 27/283; G02B 27/286; G02B 5/3016; G02B 5/305; G02B 1/02; G02B 1/043; G02B 5/02; G02B 5/0278; G02B 5/3058; G02B 1/10; G02B 2027/0112;

(Continued)

(56) References Cited

U.S. PATENT DOCUMENTS 9,946,088  B2   4/2018  Robinson et al.
2016/0077335  A1   3/2016  An et al.
2020/0089017  A1   3/2020  Wu et al.

FOREIGN PATENT DOCUMENTS

CN   208847958   5/2019
CN   109870813   6/2019
TW   201035595   10/2010

OTHER PUBLICATIONS

Quanming Chen et al., "Multi-plane augmented reality display based on cholesteric liquid crystal reflective films," Optics Express, vol. 27, No. 9, Apr. 29, 2019, pp. 12039-12047.

(Continued)

*Primary Examiner* — Collin X Beatty
*Assistant Examiner* — Grant A Gagnon
(74) *Attorney, Agent, or Firm* — JCIPRNET (57) ABSTRACT

A near-eye display apparatus including at least one display unit having a display element and an optical system is provided. The display element provides a light beam. The light beam includes a first light beam and a second light beam having different image information and different polarization states. The optical system includes a first semi-reflective element, a first polarization conversion element, and a polarization reflector, arranged in sequence along an optical axis. The polarization reflector allows a light beam having a first polarization state to pass and reflects a light beam having a second polarization state. The light path and the image distance of the second light beam are greater than the light path and the image distance of the first light beam, and the first light beam and the second light beam are emitted by at least one display unit to form a combined light beam.

15 Claims, 10 Drawing Sheets

(58) Field of Classification Search
CPC ............... G02B 21/14; G02B 27/0006; G02B 27/0101; G02B 27/0172; G02B 5/0221; G02B 5/0242; G02B 5/208; G02B 5/32; G02B 19/0028; G02B 19/0057; G02B 1/007; G02B 1/08; G02B 1/11; G02B 1/118; G02B 1/12; G02B 1/16; G02B 1/18; G02B 2027/011; G02B 2027/012; G02B 2027/0125; G02B 2027/0138; G02B 2027/0174; G02B 2027/0178; G02B 21/0032; G02B 2207/101; G02B 23/08; G02B 23/105; G02B 26/123; G02B 27/0081; G02B 27/01; G02B 27/0103; G02B 27/0905; G02B 27/0927; G02B 27/0944; G02B 27/0988; G02B 27/1046; G02B 27/14; G02B 27/142; G02B 27/145; G02B 27/28; G02B 27/281; G02B 27/285; G02B 27/48; G02B 27/52; G02B 27/58; G02B 30/25; G02B 30/27; G02B 3/00; G02B 3/005; G02B 5/008; G02B 5/0215; G02B 5/0284; G02B 5/04; G02B 5/045; G02B 5/223; G02B 5/3008; G02B 5/3075; G02B 6/00; G02B 6/0053; G02B 6/0065; G02B 6/1226; G02B 6/2726; G02B 6/2793; G02B 6/29397; G02B 6/32; G02B 6/4203; G02B 6/4206; G02B 6/4208; G02B 6/4275; G02B 6/4296; G02F 1/133528; G02F 2201/50; G02F 1/133634; G02F 2202/28; G02F 1/133607; G02F 2202/40; G02F 1/133308; G02F 1/133311; G02F 1/133531; G02F 1/13363; G02F 1/133635; G02F 2413/12; G02F 1/0136; G02F 1/0147; G02F 1/1303; G02F 1/133302; G02F 1/133305; G02F 1/13332; G02F 1/133325; G02F 1/133331; G02F 1/133357; G02F 1/133502; G02F 1/133504; G02F 1/133507; G02F 1/133526; G02F 1/133533; G02F 1/133536; G02F 1/133541; G02F 1/133548; G02F 1/133608; G02F 1/13362; G02F 1/133637; G02F 1/134363; G02F 1/13439; G02F 1/1393; G02F 1/1396; G02F 2202/023; G02F 2202/025; G02F 2202/22; G02F 2413/03; G02F 2413/04; G02F 2413/08; G02F 2413/105
USPC .......................................................... 359/485
See application file for complete search history.

(56) References Cited

OTHER PUBLICATIONS

Seokil Moon et al., "Layered Display with Accommodation Cue Using Scattering Polarizers," IEEE Journal of Selected Topics in Signal Processing, vol. 11, No. 7, Oct. 1, 2017, pp. 1223-1231.
Guanjun Tan et al., "Polarization-multiplexed multiplane display," Optics Letters, vol. 43, No. 22, Nov. 14, 2018, pp. 5651-5654.
Tao Zhan et al., "Multifocal displays: review and prospect," PhotoniX, vol. 1, No. 10, Mar. 30, 2020, pp. 1-31.
"Search Report of Europe Counterpart Application", dated Nov. 6, 2020, p. 1-p. 8.

NEAR-EYE DISPLAY APPARATUS

CROSS-REFERENCE TO RELATED APPLICATION

This application claims the priority benefit of Taiwan application serial no. 108145970, filed on Dec. 16, 2019. The entirety of the above-mentioned patent application is hereby incorporated by reference herein and made a part of this specification.

BACKGROUND

Technical Field

The disclosure relates to an optical apparatus, and particularly to a near-eye display apparatus.

Description of Related Art

The visual presentation of a stereoscopic image generally arises from the different images with a parallax angle projected respectively via a user's left eye and right eye. Hence, by converging the images of the left eye and the right eye on different planes, the user produces a stereoscopic image.

However, among the conventional stereoscopic image display apparatuses, although there are display apparatuses producing images with space impression for human eyes, such stereoscopic images do not succeed in having human eyes to focus respectively on different image planes. In other words, human eyes develop from the produced stereoscopic image neither clarity when in focus nor fuzziness when out of focus. Therefore, such image is different from the image humans observe in the real world. And this causes some users to have a vergence-accommodation conflict (VAC) and thus the issue of dizziness.

SUMMARY

Accordingly, the disclosure is directed to a near-eye display apparatus which produces stereoscopic images while avoiding a user's dizziness caused by the vergence-accommodation conflict.

The disclosure provides a near-eye display apparatus, suitable for providing a combined light beam for a user. The near-eye display apparatus includes at least one display unit. At least one display unit is suitable for providing a combined light beam. At least one display unit includes a display element and an optical system. The display element is suitable for providing a light beam. The light beam includes a first light beam and a second light beam having different image information and different polarization states. The optical system is provided on a transmission path of the light beam. The optical system includes a first semi-reflective element, a first polarization conversion element, and a polarization reflector, all arranged in sequence along an optical axis, wherein the polarization reflector is suitable for allowing a light beam having a first polarization state to pass and reflecting a light beam having a second polarization state. A light path of the second light beam is greater than a light path of the first light beam. An image distance of the second light beam is greater than an image distance of the first light beam, and the first light beam and the second light beam are emitted by at least one of the display unit in order to form the combined light beam.

Based on the above, in the near-eye display apparatus of the disclosure, the first light beam and the second light beam having different image information and different polarization states provided by the display unit can be transmitted and reflected by the optical system depending on different polarization states, and thus different light paths are produced. Hence, the user is enabled to observe the first light beam and the second light beam having different image distances. In doing so, the user obtains an image combined from the images with different image distances which correspond to different depths, and thereby observing a stereoscopic image without the dizziness caused by a vergence-accommodation conflict.

The accompanying drawings are included to provide a further understanding of the disclosure and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1A:
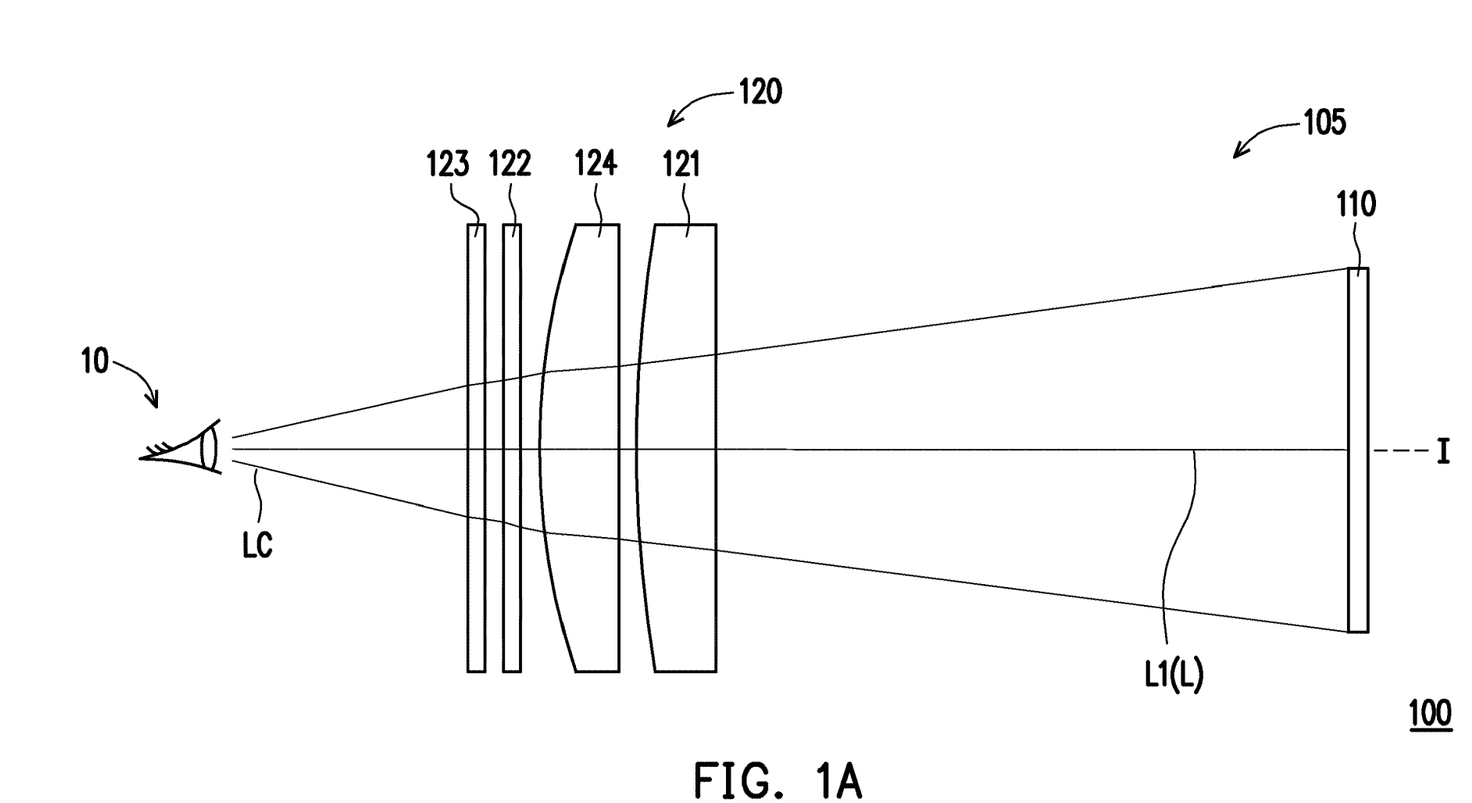
FIG. 1A and FIG. 1B are respectively schematic views of light paths having different polarization states of a near-eye display apparatus according to an embodiment of the disclosure.
Figure 1B:
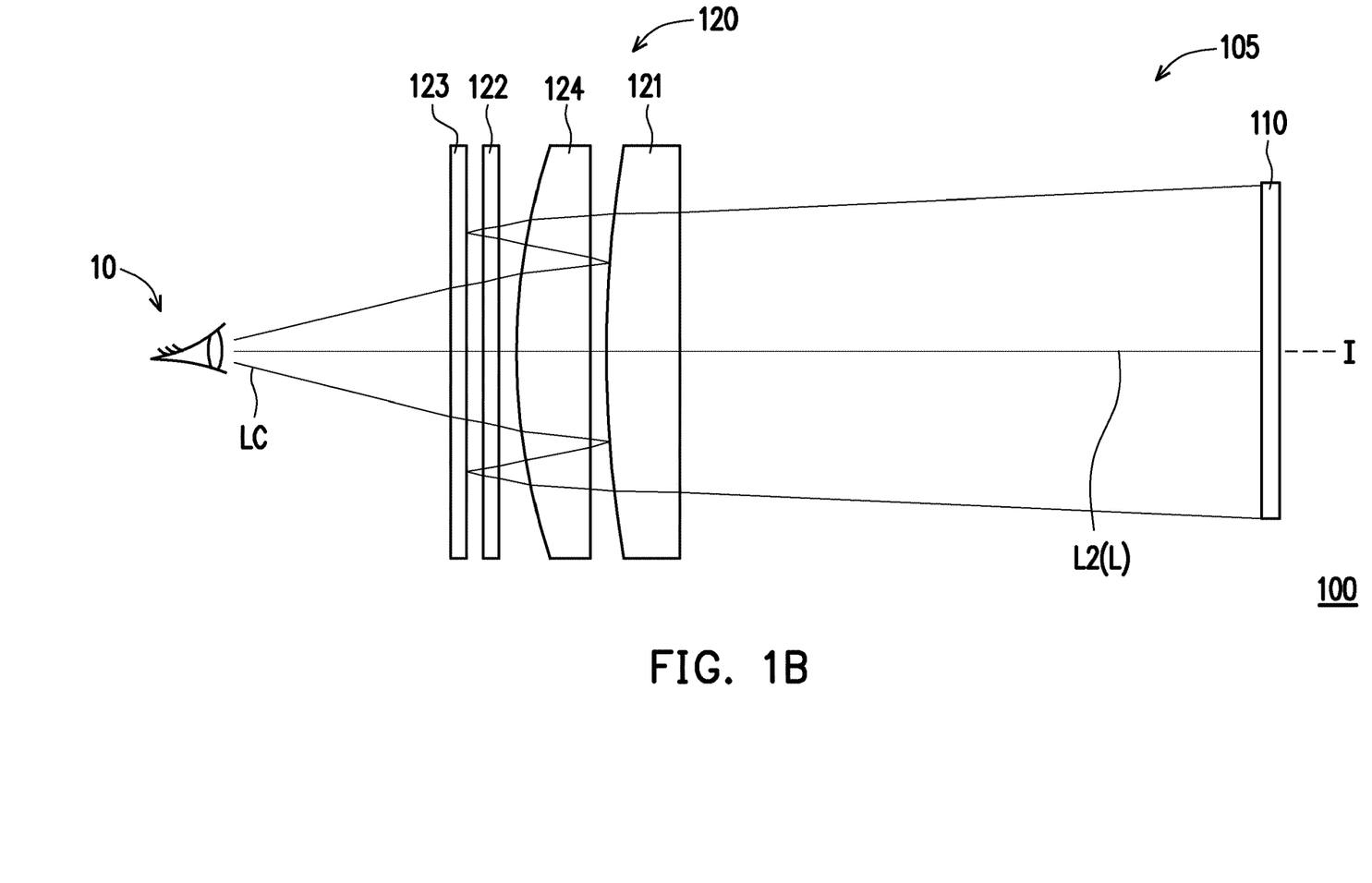

FIG. 1A and FIG. 1B are respectively schematic views of light paths having different polarization states of a near-eye display apparatus according to an embodiment of the disclosure. Referring to FIG. 1A and FIG. 1B, in the present embodiment, a near-eye display apparatus 100 is suitable for providing a combined light beam LC to a user 10, such as directly providing an image to human eyes, as illustrated in FIG. 1A. Alternatively, the near-eye display apparatus 100 may also cooperate with an additional optical system to transmit the combined light beam LC to human eyes to achieve the application of virtual reality (VR) or augmented reality (AR). The disclosure is not limited thereto.

The near-eye display apparatus 100 includes at least one display unit 105 for providing the combined light beam LC having different image planes (i.e., having different image distances). In the present embodiment, the number of the display unit 105 may be, for example, one, but in some embodiments, the number of the display unit 105 may be plural. The disclosure is not limited thereto.

The display unit 105 includes a display element 110 and an optical system 120. The display element 110 is suitable for providing a light beam L, and the light beam L includes a first light beam L1 and a second light beam L2 having different image information and different polarization states. In the present embodiment, the display unit 110, for example, is a display that provides the first light beam L1 in a right-handed circular polarization state (hereafter as R polarization state), as illustrated in FIG. 1A, and the second light beam L2 in a left-handed circular polarization state (hereafter as L polarization state), as illustrated in FIG. 1A. However, in some embodiments, the first light beam L1 and the second light beam L2 may also be other various types of polarized light different from each other. The disclosure is not limited thereto. The display element 110 may provide different polarization states by, for example, providing the different polarizing states simultaneously or alternately on a periodic basis. The disclosure is not limited thereto.

The optical system 120 is provided on a transmission path of the light beam L. The optical system 120 includes a first semi-reflective element 121, a first polarization conversion element 122, and a polarization reflector 123, arranged in sequence along an optical axis I. The first semi-reflective element 121, for example, is a condensing lens having a semi-transmissive and semi-reflective coating, which is used for allowing 50% of the light beam L to pass and reflecting the other 50% of the light beam L, but the disclosure is not limited to the ratio of the reflectivity and transmittance. The reflectivity and transmittance may also be 60% and 40%, or 70% and 30%.

The first polarization conversion element 122, for example, is a quarter-wave plate for converting the polarization states of the first light beam L1 and the second light beam L2. For example, in the present embodiment, the first polarization conversion element 122 may convert the passing first light beam L1 from the R polarization state into a P polarization state, and convert the passing second light beam L2 from the L polarization state into an S polarization state.

The polarization reflector 123, for example, is an optical element which reflects a single polarization state, which is used for reflecting a light having a designated polarization state while allowing a light beam having a non-designated polarization state to pass. In other words, the polarization reflector 123 is suitable for allowing a light beam having a first polarization state to pass and reflecting a light beam having a second polarization state. For example, in the present embodiment, the polarization reflector 123 is an optical element which reflects the S polarization state. In other words, the polarization reflector 123 allows the first light beam L1 which has been converted in to the P polarization state to pass, and reflects the second light beam L2 which has been converted in to the S polarization state. Thus, the first light beam L1 passes through the polarization reflector 123 in order to be transmitted from the optical system 120. And the second light beam L2 is reflected by the polarization reflector 123 and transmitted back to the optical system 120 to increase the length of the transmission path.

In the present embodiment, the optical system 120 further includes a at least one lens 124 having refractive power, located between the first semi-reflective element 121 and the first polarization conversion element 122, but the disclosure is not limited thereto.

Reflected by the polarization reflector 123 back to the optical system 120, the second light beam L2 is then transmitted to the first polarization conversion element 122 and the first semi-reflective element 121 in sequence. When the polarization reflector 123 reflects the second light beam L2 back to the optical system 120 and to pass the first polarization conversion element 122, the second light beam L2 is converted from the S polarization state into the R polarization state. Then, via the reflection effect of the first semi-reflective element 121, 50% of the second light beam L2 having the R polarization state is then again transmitted toward the first polarization conversion element 122. Hence, the second light beam L2 which is transmitted again toward the first polarization conversion element 122 is converted into the P polarization state by passing through the first polarization conversion element 122, and then is subsequently transmitted to pass through the polarization reflector 123 which allows light in the P polarization state to pass through, as illustrated in FIG. 1B.

Table 1 below lists in detail the transmission paths and the converted polarization states of the first light beam L1 and the second light beam L2 in FIG. 1A and FIG. 1B (for the ease of description, the polarization states when transmitted to the lens 124 are omitted). After referring to the disclosure, those skilled in the art may make various modifications and variations to the parameters or settings of the present disclosure without departing from the scope or spirit of the disclosure.

TABLE 1

| | first light beam L1 | | | second light beam L2 | |
| --- | --- | --- | --- | --- | --- |
| element | ways of transmission | polarization state | element | ways of transmission | polarization state |
| display element 110 | transmitted to 121 | R | display element 110 | transmitted to 121 | L |
| first semi-reflective element 121 | 50% transmitted to the 122 | R | first semi-reflective element 121 | 50% transmitted to the 122 | L |
| first polarization conversion element 122 | transmitted to the 123 | R→P | first polarization conversion element 122 | transmitted to the 123 | L→S |
| first polarization conversion element 123 | transmitted to the 10 | P | first polarization conversion element 123 | reflected back to the 122 | S |

TABLE 1-continued

| | first light beam L1 | | | second light beam L2 | |
|---|---|---|---|---|---|
| element | ways of transmission | polarization state | element | ways of transmission | polarization state |
| user 10 | | P | first polarization conversion element 122 | transmitted to the 121 | S→R |
| | | | first semi-reflective element 121 | 50% reflected to the 122 | R |
| | | | first polarization conversion element 122 | transmitted to the 123 | R→P |
| | | | first polarization conversion element 123 | transmitted to the 10 | P |
| | | | user 10 | | P |

Figure 2:
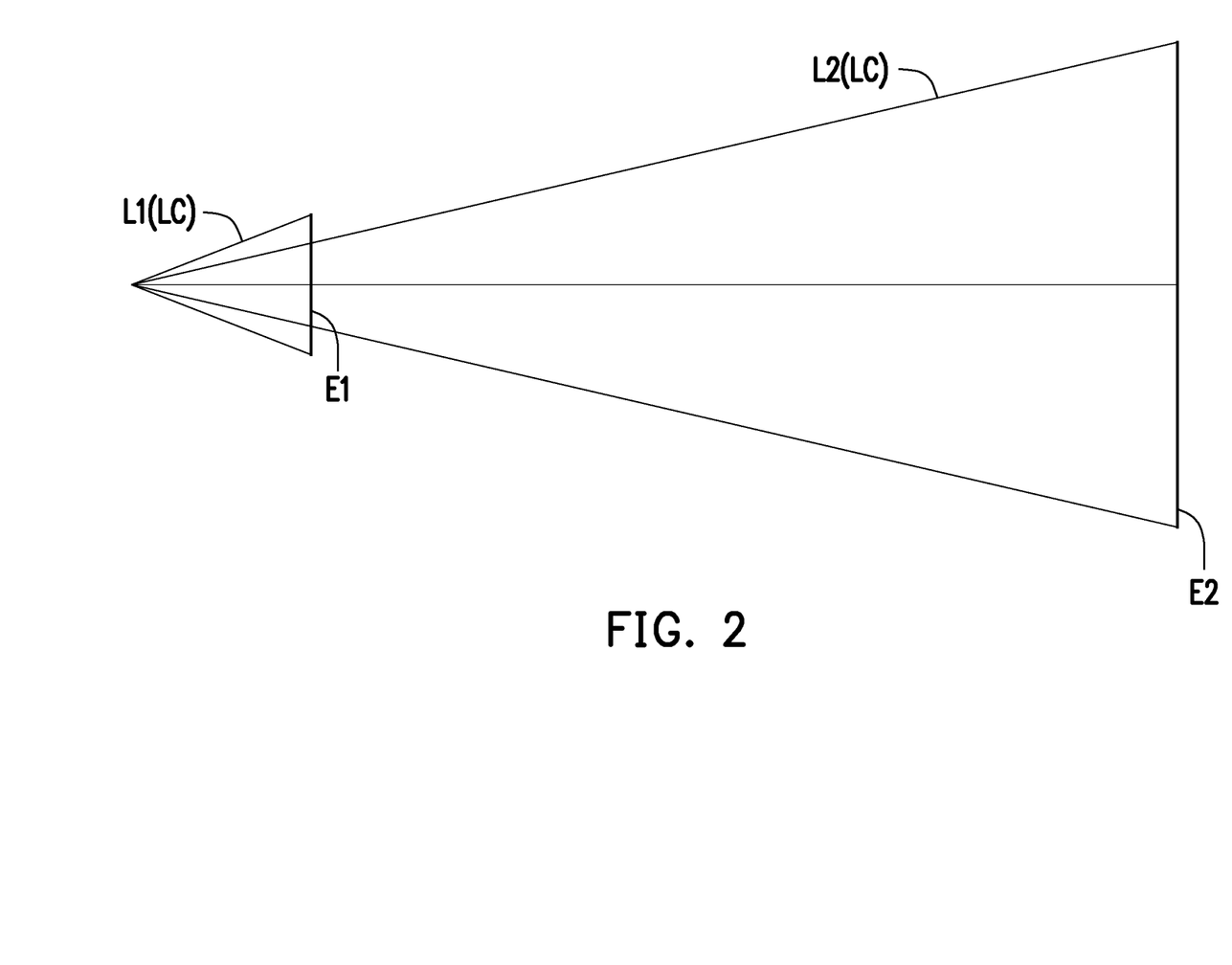
FIG. 2 is a schematic plan view of the imaging of the combined light beam of the near-eye display apparatus in FIG. 1A.

FIG. 2 is a schematic plan view of the imaging of the combined light beam of the near-eye display apparatus in FIG. 1A. Referring to FIG. 2, the first light beam L1 and the second light beam L2 are emitted by the display unit 105 in order to form the combined light beam LC. And, via optical effects of the first semi-reflective element 121, the first polarization conversion element 122, and the first polarization conversion element 123, the light path of the second light beam L2 is greater than the light path of the first light beam L1. Hence, the user is enabled to observe the first light beam L1 imaging upon an image plane E1 and the second light beam L2 imaging upon an image plane E2. In other words, the user is able to observe that the image distance of the second light beam L2 is greater than the image distance of the first light beam L1, as illustrated in FIG. 2. In the present embodiment, the first light beam L1, for example, is a light beam with image information having a shorter virtual image distance, whereas the second light beam L2, for example, is a light beam with image information having a longer virtual image distance. In doing so, the user obtains an image combined from the images having different image distances which correspond to different depths, and thereby the user can observe a stereoscopic image without the dizziness caused by the vergence-accommodation conflict.

Figure 3A:
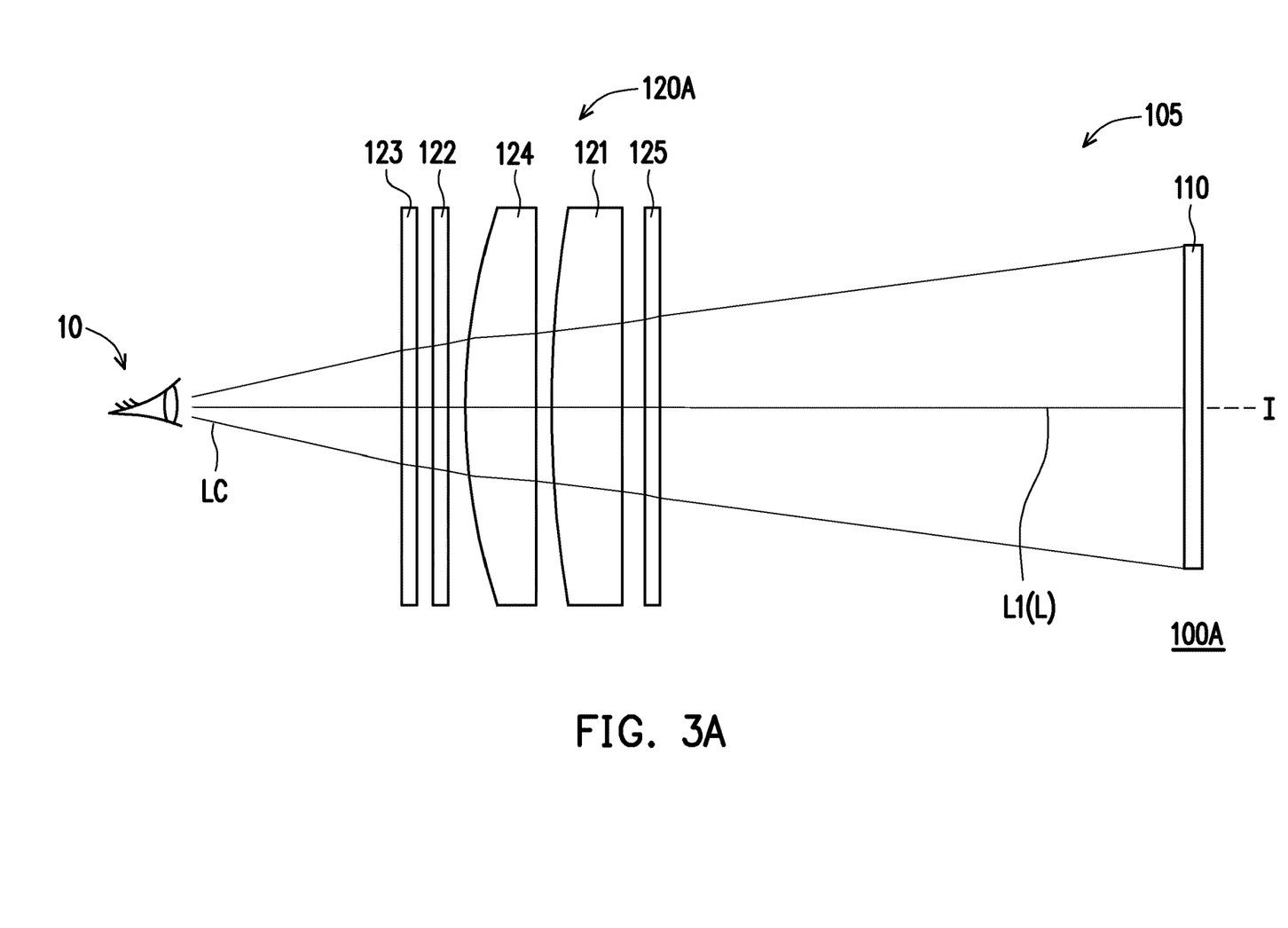
FIG. 3A and FIG. 3B are respectively schematic views of light paths having different polarization states of a near-eye display apparatus according to another embodiment of the disclosure.
Figure 3B:
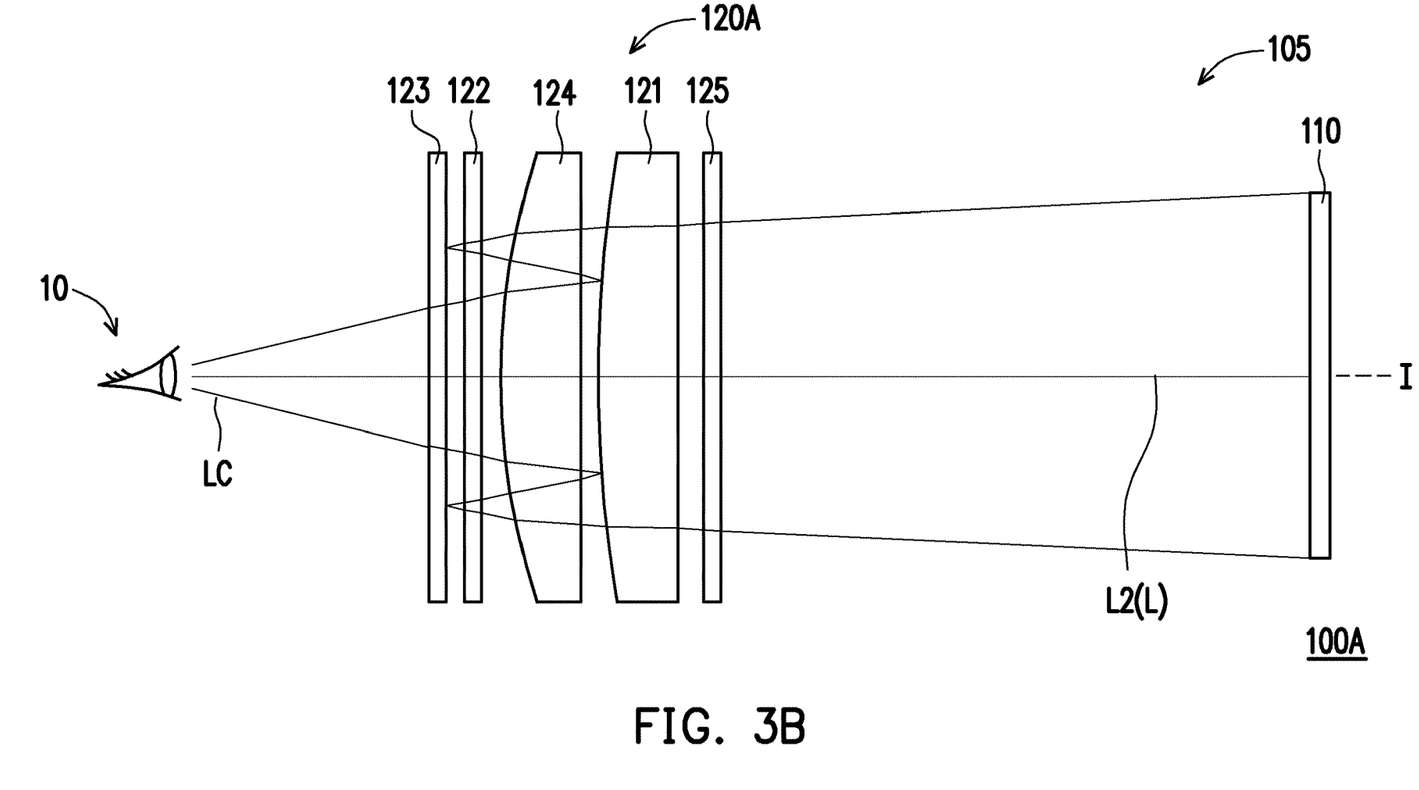

FIG. 3A and FIG. 3B are respectively schematic views of light paths having different polarization states of a near-eye display apparatus according to another embodiment of the disclosure. Referring to FIG. 3A and FIG. 3B, a near-eye display apparatus 100A of the present embodiment is similar to the near-eye display apparatus 100 of FIG. 1A and FIG. 1B. The difference of the two lies in that, in the present embodiment, the display element 110 provides the first light beam L1 having the P polarization state and the second light beam L2 having the S polarization state, and an optical system 120A further includes a second polarization conversion element 125, which is located between the display unit 110 and the first semi-reflective element 121. The second polarization conversion element 125 and the first polarization conversion element 122, for example, are quarter-wave plates for converting the polarization states of the first light beam L1 and the second light beam L2. Thus, in the present embodiment, the second polarization conversion element 125 can convert the passing first light beam L1 from the P polarization state into an R polarization state and convert the passing second light beam L2 from the S polarization state into the L polarization state.

Table 2 below lists in detail the transmission paths and the converted polarization states of the first light beam L1 and the second light beam L2 in FIG. 3A and FIG. 3B (for the ease of description, the polarization states of the transmission to the lens 124 is omitted). However, it is not the intention of the data listed below to limit the present disclosure. By referring to the present disclosure, those skilled in the art can make suitable modifications to the parameters or settings of the present disclosure, but the modifications should be taken as a part of the scope of the present disclosure.

TABLE 2

| | first light beam L1 | | | second light beam L2 | |
|---|---|---|---|---|---|
| element | ways of transmission | polarization state | element | ways of transmission | polarization state |
| display element 110 | transmitted to 125 | P | display element 110 | transmitted to 125 | S |
| second polarization conversion element 125 | transmitted to 121 | R | second polarization conversion element 125 | transmitted to 121 | L |
| first semi-reflective element 121 | 50% transmitted to 122 | R | first semi-reflective element 121 | 50% transmitted to 122 | L |
| first polarization conversion element 122 | transmitted to 123 | R→P | first polarization conversion element 122 | transmitted to 123 | L→S |

TABLE 2-continued

| | first light beam L1 | | | second light beam L2 | |
|---|---|---|---|---|---|
| element | ways of transmission | polarization state | element | ways of transmission | polarization state |
| first polarization conversion element 123 | transmitted to 10 | P | first polarization conversion element 123 | reflected back to 122 | S |
| user 10 | | P | first polarization conversion element 122 | transmitted to 121 | S→R |
| | | | first semi-reflective element 121 | 50% reflected to 122 | R |
| | | | first polarization conversion element 122 | transmitted to 123 | R→P |
| | | | first polarization conversion element 123 | transmitted to 10 | P |
| | | | user 10 | | P |

Figure 4:
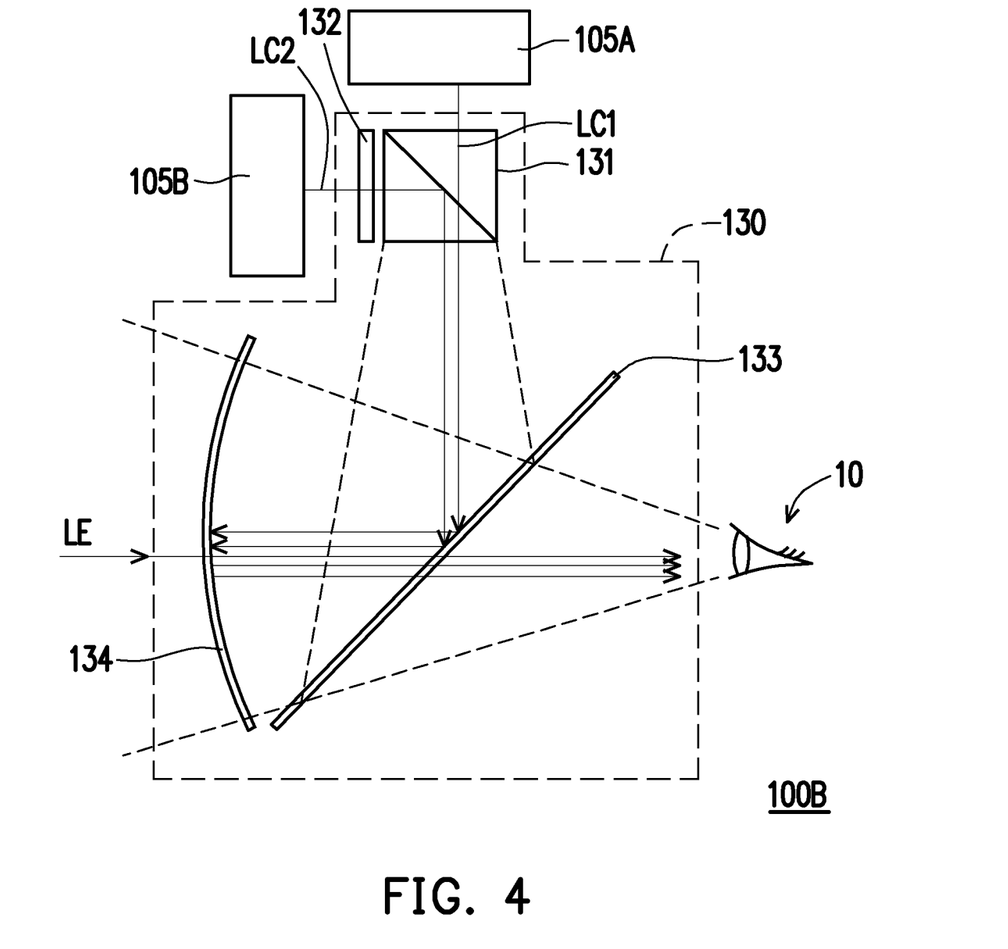
FIG. 4 is a schematic view of a near-eye display apparatus according to another embodiment of the disclosure.
Figure 5:
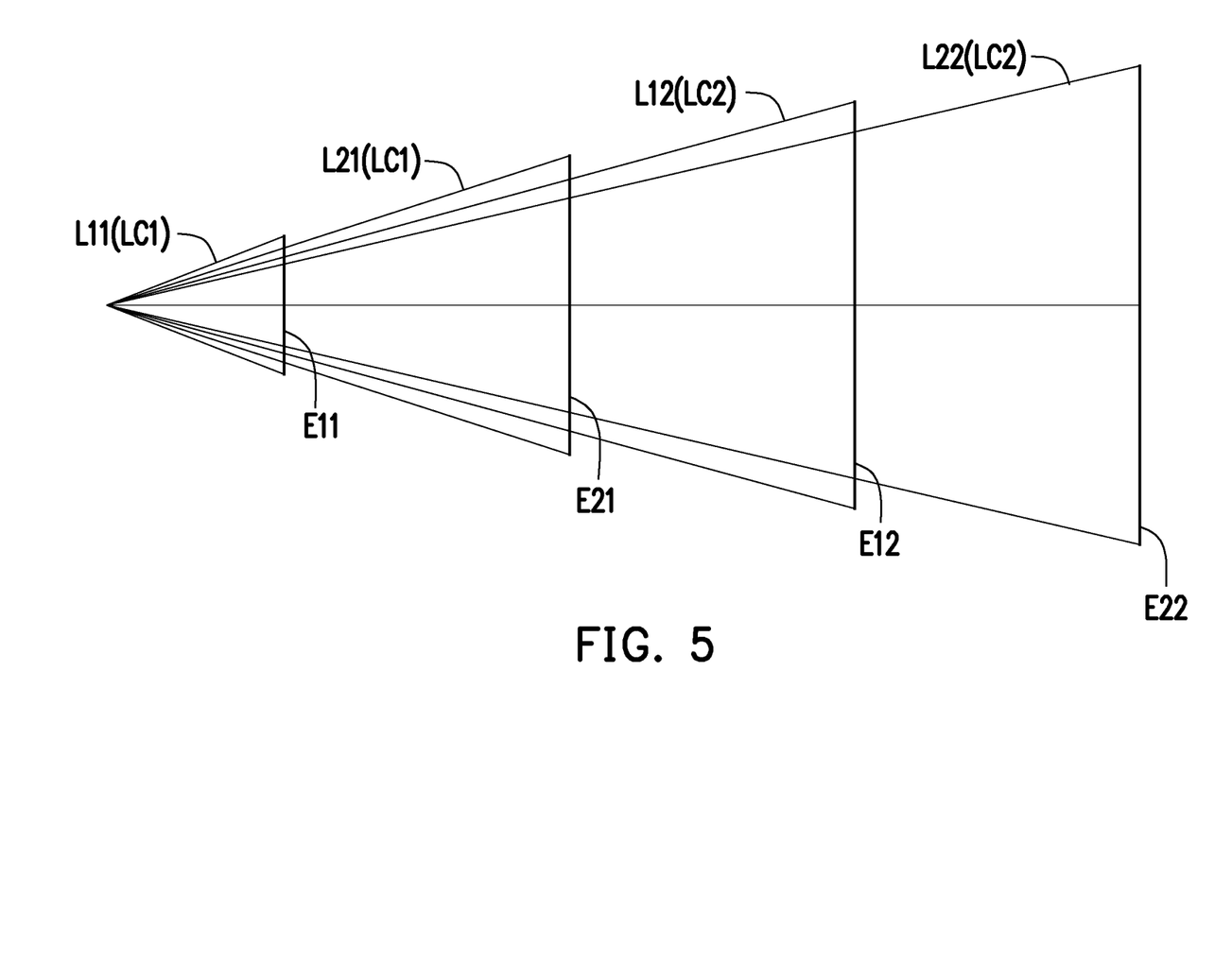
FIG. 5 is a schematic plan view of the imaging of the combined light beam of the near-eye display apparatus in FIG. 4.

FIG. 4 is a schematic view of a near-eye display apparatus according to another embodiment of the disclosure. FIG. 5 is a schematic plan view of the imaging of the combined light beam of the near-eye display apparatus in FIG. 4. Referring to FIG. 4 and FIG. 5, a near-eye display apparatus 100B of the present embodiment is similar to the near-eye display apparatus 100 of FIG. 1A and FIG. 1B. The difference of the two lies in that, in the present embodiment, the number of display units 105A and 105B is two, and that the image distances of a first light beam L11 and a first light beam L21, the image distances of a second light beam L12 and a second light beam L22, or the image distances of the combinations thereof in a combined light beam LC1 and a combined light beam LC2 are different. To put it in specific terms, in the present embodiment, the image distance of the first light beam L11 provided by the display unit 105A is different from the image distance of the first light beam L21 provided by the display unit 105B, and the image distance of the second light beam L12 provided by the display unit 105A is different from the image distance of the second light beam L22 provided by the display unit 105B. Thus, the user is enabled to observe the first light beam L11 provided by the display unit 105A imaging upon an image plane E11, the second light beam L12 provided by the display unit 105A imaging upon an image plane E12, the first light beam L21 provided by the display unit 105B imaging upon an image plane E21, and the second light beam L22 provided by the display unit 105B imaging upon an image plane E22, as illustrated in FIG. 5. In the present embodiment, the first light beams L11 and L21, for example, are light beams with image information having shorter virtual image distance whereas the second light beams L12 and L22, for example, are light beams with image information having longer virtual image distance. In doing so, the user obtains an image combining different image distances which respectively correspond to different depths, and thereby the user can observe a stereoscopic image without the dizziness caused by the vergence-accommodation conflict.

In addition, in the present embodiment, the near-eye display apparatus 100B further includes an optical expansion module 130 provided on the transmission paths of the combined light beams LC1 and LC2. The optical expansion module 130 is a virtual reality optical module or an augmented reality optical module. To put it in detail, the optical expansion module 130 includes a first light splitting element 131, a relay element 132, a second light splitting element 133, and a first focusing element 134.

The first light splitting element 131 is provided on the transmission paths of the combined light beams LC1 and LC2. The first light splitting element 131, for example, is a polarizing beam splitter (PBS) for light having a P polarization state to pass and for reflecting light having the S polarization state. The relay element 132 is provided on one of the transmission paths of the combined light beams LC1 and LC2. The relay element 132, for example, is a quarter-wave plate for converting the polarization state of a light beam. For example, in the present embodiment, the combined light beams LC1 and LC2 provided by the display units 105A and 105B are both in the P polarization state, and the relay element 132 provided on the transmission path of the combined light beam LC2 converts the combined light beam LC2 from the P polarization state into the S polarization state. Thus, the first light splitting element 131 allows the combined light beam LC1 having a P polarization state to pass and reflects the combined light beam LC2 having the S polarization state, and thereby converging the combined light beam LC1 and the combined light beam LC2 onto a same transmission path, as illustrated in FIG. 4.

The second light splitting element 133, for example, is a plate light-transmission element which is semi-transmissive and semi-reflective for passing 50% of the combined light beams LC1 and LC2 and reflecting the other 50% of the combined light beams LC1 and LC2, but the disclosure does not limit the ratio of reflectivity and transmittance. The first focusing element 134, for example, is a curved light-transmission element which is semi-transmissive and semi-reflective for passing 50% of the combined light beams LC1 and LC2 and reflecting the other 50% of the combined light beams LC1 and LC2, but the disclosure does not limit the ratio of reflectivity and transmittance. In the present embodiment, the second light splitting element 133 is provided between the first light splitting element 131 and the first focusing element 134, and an environment light beam LE is suitable for passing through the first focusing element 134 and the second light splitting element 133 and arriving at the user 10 in sequence. Thus, the combined light beams LC1 and LC2 converged and provided by the first light splitting element 131 are reflected partially by the second light splitting element 133 to the first focusing element 134. Then, by the reflection of the first focusing element 134, the combined light beams LC1 and LC2 are converged with the environment light beam LE and transmitted partially to pass through the second light splitting element 133 and arrive at the user 10.

Figure 6:
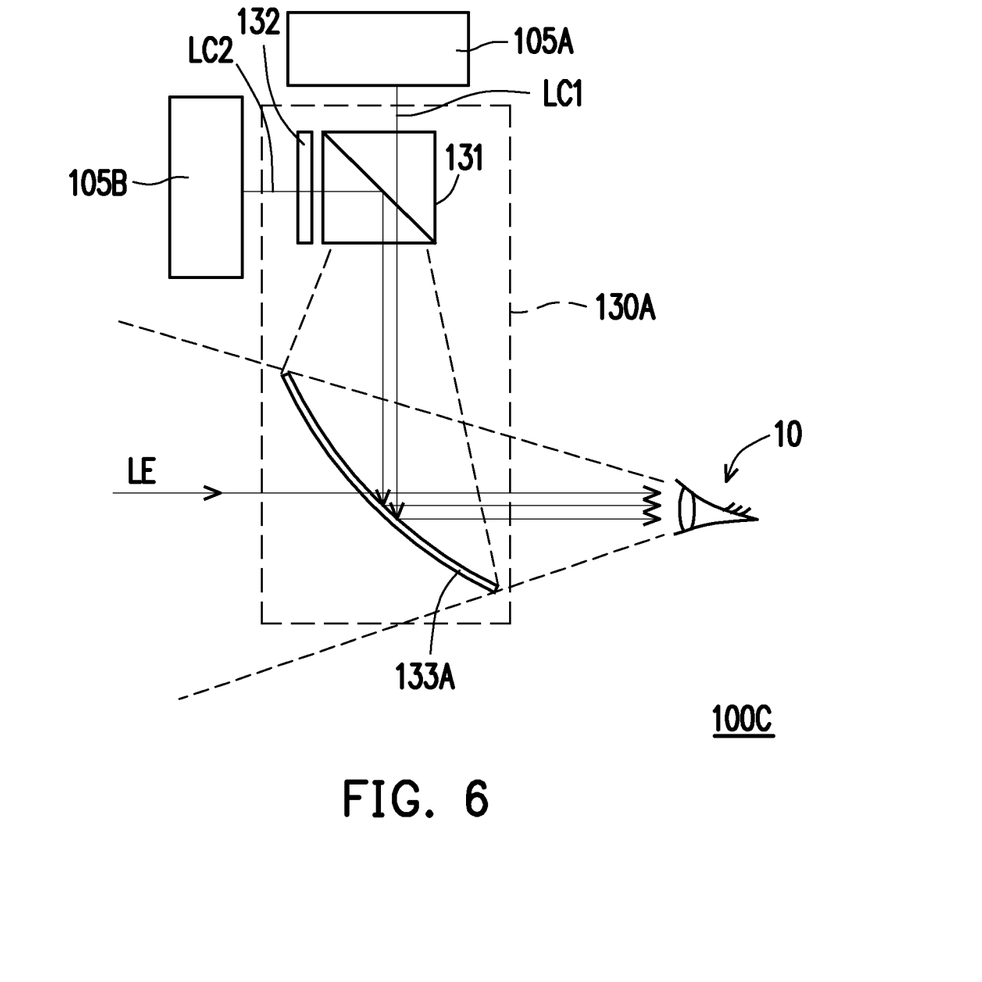
FIG. 6 is a schematic view of a near-eye display apparatus according to another embodiment of the disclosure.

FIG. 6 is a schematic view of a near-eye display apparatus according to another embodiment of the disclosure. Referring to FIG. 6, a near-eye display apparatus 100C of the present embodiment is similar to the near-eye display apparatus 100B of FIG. 4. The difference of the two lies in that, in the present embodiment, a second light splitting element 133A of an optical expansion module 130A has a focusing function. The second light splitting element 133A is provided between the first light splitting element 131 and the user 10 for reflecting a portion of the combined light beams LC1 and LC2 to the user 10, and the environment light beam LE is suitable for passing through the second light splitting element 133A and to the user 10. In other words, compared to the embodiment of FIG. 4, the present embodiment omits the first focusing element 134. In doing so, elements as well as the overall volume can be reduced.

Figure 7:
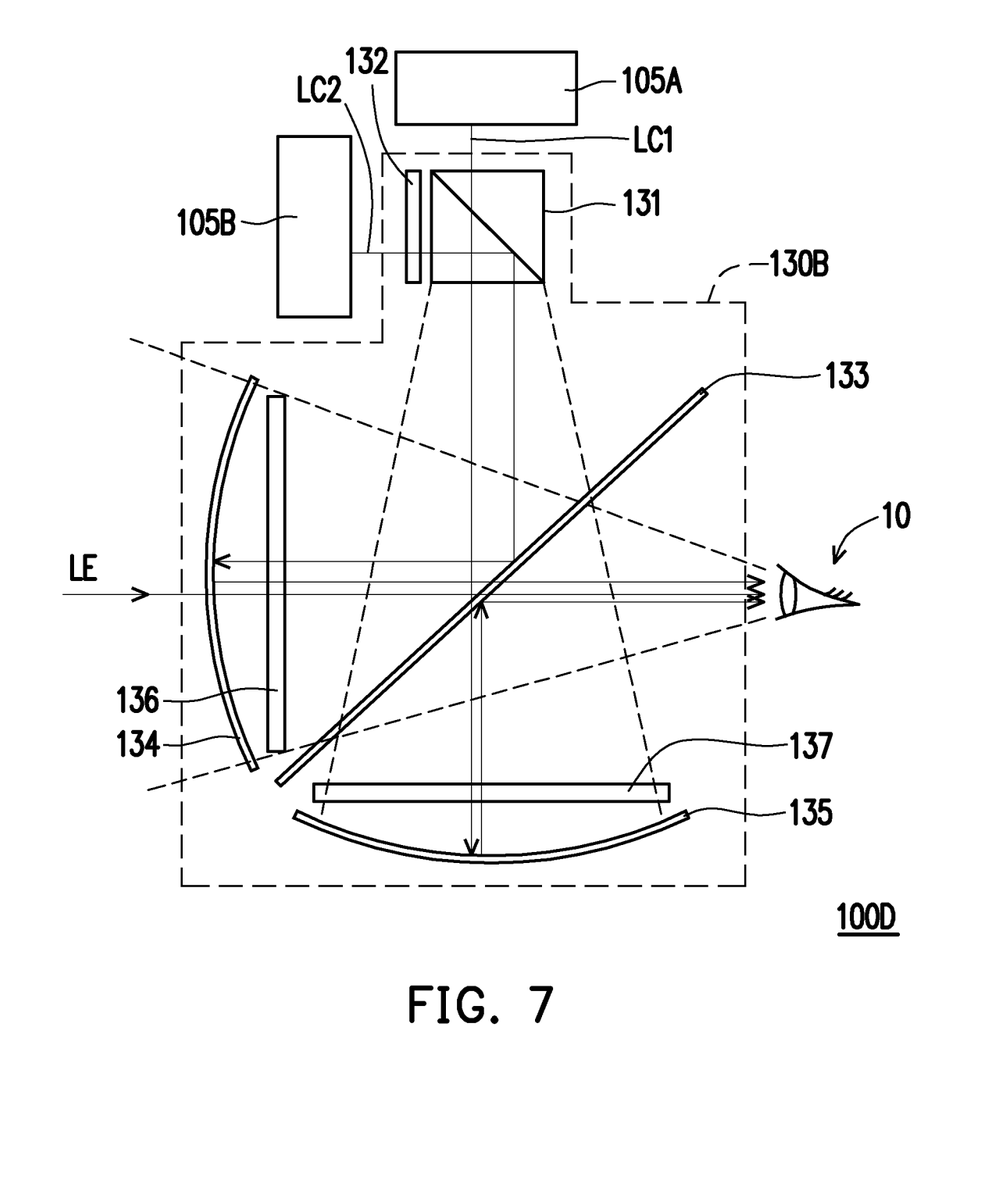
FIG. 7 is a schematic view of a near-eye display apparatus according to another embodiment of the disclosure.

FIG. 7 is a schematic view of a near-eye display apparatus according to another embodiment of the disclosure. Referring to FIG. 7, a near-eye display apparatus 100D of the present embodiment is similar to the near-eye display apparatus 100B of FIG. 4. The difference of the two lies in that, in the present embodiment, an optical expansion module 130B further includes a third polarization conversion element 136, a fourth polarization conversion element 137, and a second focusing element 135, and the environment light beam LE is suitable for passing through the first focusing element 134, the third polarization conversion element 136, and the second light splitting element 133 to the user 10 in sequence. The second light splitting element 133 of the present embodiment, for example, is a polarizing beam splitter, and the second focusing element 135, for example, is a curved surface reflecting mirror for light having the P polarization state to pass and for reflecting light having the S polarization state. The third polarization conversion element 136 and the fourth polarization conversion element 137, for example, are quarter-wave plates for converting the polarization states of a light beam.

Hence, in the present embodiment, the combined light beam LC1 having the P polarization state provided by the first light splitting element 131 is transmitted to pass through the second light splitting element 133 and is converted into the L polarization state by the fourth polarization conversion element 137. Then, the combined light beam LC1 having the L polarization state is reflected by the second focusing element 135 and passes again though the fourth polarization conversion element 137 in order to be converted into the S polarization state. Lastly, the combined light beams LC1 having the S polarization state is reflected by the second light splitting element 133 to the user 10. Moreover, the combined light beam LC2 having the S polarization state provided by the first light splitting element 131 is reflected by the second light splitting element 133 to the third polarization conversion element 136 in order to be converted into the R polarization state. Then, the combined light beam LC2 having the R polarization state is transmitted to and then reflected by the first focusing element 134 and passes again though the third polarization conversion element 136 in order to be converted into the P polarization state. Lastly, the combined light beam LC2 having the P polarization state passes through the second light splitting element 133 to the user 10. Thus, the combined light beams LC1 and LC2 may be converged with the environment light beam LE and be transmitted to the user 10. In doing so, the user obtains an image combining different image distances which correspond to different depths, and thereby the user can observe a stereoscopic image without the dizziness caused by the vergence-accommodation conflict.

Figure 8:
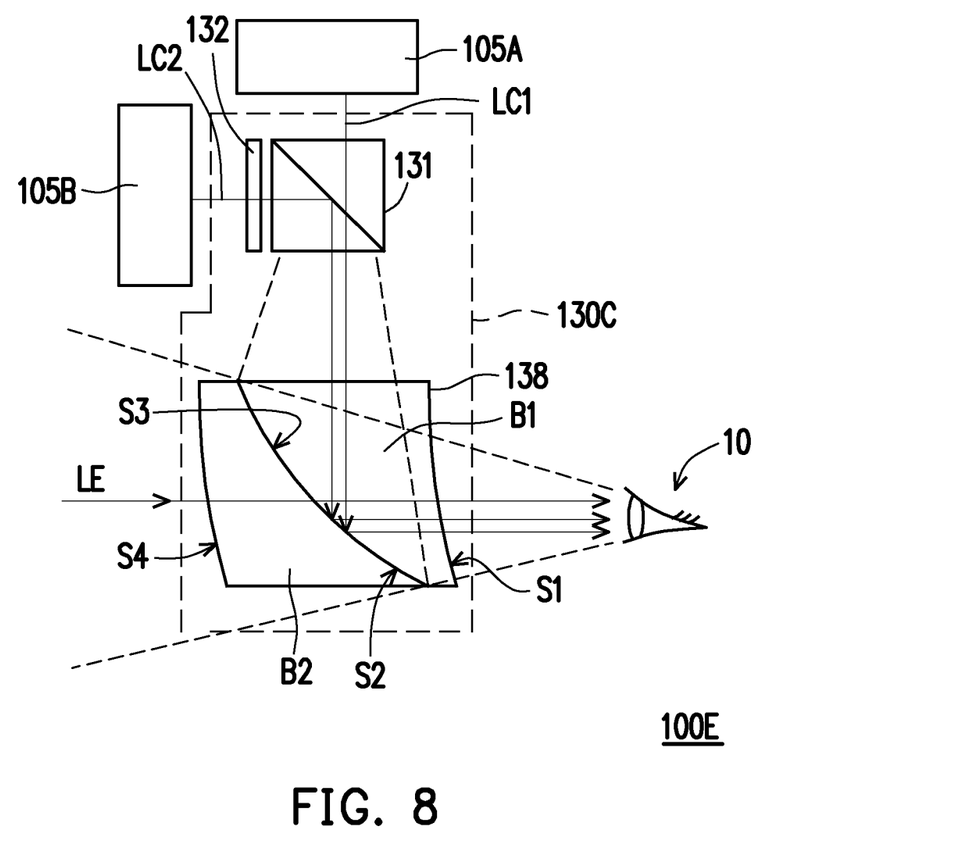
FIG. 8 is a schematic view of a near-eye display apparatus according to another embodiment of the disclosure.

FIG. 8 is a schematic view of a near-eye display apparatus according to another embodiment of the disclosure. Referring to FIG. 8, a near-eye display apparatus 100E of the present embodiment is similar to the near-eye display apparatus 100C of FIG. 6. The difference of the two lies in that, in the embodiment, an optical expansion module 130C includes an optical element combiner 138 which replaces the second light splitting element 133A shown in FIG. 6. The optical element combiner 138 is formed by a plurality of light light-transmission elements. For example, in the embodiment, the optical element combiner 138 includes a first light transmission element B1 and a second light transmission element B2, the first light transmission element B1 has a first surface S1 and a second surface S2, and the second light transmission element B2 has a third surface S3 and a fourth surface S4. In the embodiment, the material of the first light transmission element B1 may be the same as or different from the material of the second light transmission element B2. However, the disclosure does not intend to impose a limitation on this regard.

The first surface S1 of the first light transmission element B1 and the fourth surface S4 of the second light transmission element B2 respectively face toward a direction away from the optical element combiner 138. In addition, the second surface S2 of the first light transmission element B1 and the third surface S3 of the second light transmission element B2 respectively face toward each other. For example, in the embodiment, the second surface S2 of the first light transmission element B1 and the third surface S3 of the second light transmission element B2 jointly form a free form surface like the second light splitting element 133A shown in FIG. 6. The surface is a partially semi-reflective surface. For example, one of the third surface S3 and the fourth surface S4 may form a coated film that is semi-transmissive and semi-reflective. Accordingly, a portion of the combined light beams LC1 and LC2 is reflected by the surface and transmitted to the user 10, and a portion of the environment beam LE is transmitted to the user 10 via the surface. In doing so, the user obtains an image combining different image distances which correspond to different depths of field, and thereby the user observes a stereoscopic image without the dizziness caused by the vergence-accommodation conflict. In the embodiment, the first surface S1 to the fourth surface S4 are free form surfaces, for example. However, in other embodiments, the first surface S1 to the fourth surface S4 may also be spherical, non-spherical, or other types of surfaces. The disclosure does not intend to impose a limitation on this regard.

In summary, in the near-eye display apparatus of the disclosure, the first light beam and the second light beam having different image information and different polarization states provided by the display unit may be transmitted and reflected by the optical system depending on different polarization states, and thus different light paths are formed. Hence, the user is enabled to observe the first light beam and the second light beam having different image distances. In doing so, the user obtains an image combining different image distances which correspond to different depths of field, and thereby the user observes a stereoscopic image without the dizziness caused by the vergence-accommodation conflict.

It is apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A near-eye display apparatus suitable for providing a combined light beam to a user, the near-eye display apparatus comprising:
    at least one display unit, suitable for providing the combined light beam, the display unit comprising:
        a display element, suitable for providing a light beam, the light beam comprising a first light beam and a second light beam having different image information and different polarization states; and
        an optical system, provided on a transmission path of the light beam, and comprising a first semi-reflective element, a first polarization conversion element, and a polarization reflector arranged in sequence along an optical axis, wherein
    the polarization reflector is suitable for allowing a light beam having a first polarization state to pass and reflecting a light beam having a second polarization state, a light path of the second light beam is greater than a light path of the first light beam, an image distance of the second light beam is greater than an image distance of the first light beam, and the first light beam and the second light beam are emitted by the at least one display unit in order to form the combined light beam.

2. The near-eye display apparatus according to claim 1, wherein the optical system further comprises a second polarization conversion element, located between the display element and the first semi-reflective element.

3. The near-eye display apparatus according to claim 1, wherein the optical system further comprises an at least one lens having refractive power, located between the first semi-reflective element and the first polarization conversion element.

4. The near-eye display apparatus according to claim 1, wherein a number of the at least one display unit is two, and the image distances of the first light beams, the second light beams, or a combination thereof in the combined beams provided by the display units are different.

5. The near-eye display apparatus according to claim 4, further comprising:
    an optical expansion module, provided on the transmission paths of the combined light beams, wherein the optical expansion module is a virtual reality optical module or an augmented reality optical module.

6. The near-eye display apparatus according to claim 5, wherein the optical expansion module further comprises a first light splitting element and a relay element, the relay element is provided on the transmission path of one of the combined light beams, and the first light splitting element is suitable for reflecting the one of the combined light beams and allowing the other one of the combined light beams to pass.

7. The near-eye display apparatus according to claim 6, wherein the optical expansion module further comprises a second light splitting element and a first focusing element, the second light splitting element is provided between the first light splitting element and the first focusing element, and an environment light beam is suitable for passing through the first focusing element and the second light splitting element and being transmitted to the user.

8. The near-eye display apparatus according to claim 6, wherein the optical expansion module further comprises a second light splitting element, and the second light splitting element is provided between the first light splitting element and the user, wherein an environment light beam is suitable for passing through the second light splitting element and being transmitted to the user.

9. The near-eye display apparatus according to claim 6, wherein the optical expansion module further comprises a second light splitting element, a third polarization conversion element, a fourth polarization conversion element, a first focusing element, and a second focusing element, the second light splitting element is provided between the light splitting element and the user, one of the combined light beams is suitable for passing through the third polarization conversion element via reflection by the second light splitting element and being transmitted to the first focusing element, and the other one of the combined light beams is suitable for passing through the second light splitting element and the fourth polarization conversion element and being transmitted to the second focusing element.

10. The near-eye display apparatus according to claim 9, wherein an environment light beam is suitable for passing through the first focusing element, the third polarization conversion element, and the second light splitting element and being transmitted to the user.

11. The near-eye display apparatus according to claim 6, wherein the optical expansion module is an optical element combiner formed by a plurality of light transmission elements.

12. The near-eye display apparatus according to claim 6, wherein the optical expansion module comprises a first light transmission element and a second light transmission element, the first light transmission element comprises a first surface and a second surface, the second light transmission element comprises a third surface and a fourth surface, and the third surface and the fourth surface are coplanar.

13. The near-eye display apparatus according to claim 12, wherein one of the third surface and the fourth surface is provided with a coated film that is semi-transmissive and semi-reflective.

14. The near-eye display apparatus according to claim 12, wherein the first surface, the second surface, the third surface, and the fourth surface is a free form surface, a spherical surface, a non-spherical surface, or any combination thereof.

15. The near-eye display apparatus according to claim 12, wherein a material of the first light transmission element and a material of the second light transmission element are different.

* * * * *